(12) United States Patent
Fumagalli

(10) Patent No.: US 11,015,126 B2
(45) Date of Patent: May 25, 2021

(54) APPARATUS AND METHOD FOR PRODUCING BIOMASS DERIVED LIQUID, BIO-FUEL AND BIO-MATERIAL

(71) Applicant: EME INTERNATIONAL LIMITED, Pieta (MT)

(72) Inventor: Enrico Fumagalli, Paradiso (CH)

(73) Assignee: EME International Limited, Pieta (MT)

( * ) Notice: Subject to any disclaimer, the term of this patent is extended or adjusted under 35 U.S.C. 154(b) by 0 days.

(21) Appl. No.: 16/474,648

(22) PCT Filed: Dec. 21, 2017

(86) PCT No.: PCT/EP2017/084093
§ 371 (c)(1),
(2) Date: Jun. 28, 2019

(87) PCT Pub. No.: WO2018/122096
PCT Pub. Date: Jul. 5, 2018

(65) Prior Publication Data
US 2019/0322945 A1    Oct. 24, 2019

(30) Foreign Application Priority Data
Dec. 30, 2016    (IT) .................. 102016000132801

(51) Int. Cl.
*C10G 1/08*    (2006.01)
*B01J 4/00*    (2006.01)
(Continued)

(52) U.S. Cl.
CPC .............. *C10G 1/083* (2013.01); *B01J 4/002* (2013.01); *B01J 4/008* (2013.01); *B01J 19/0013* (2013.01);
(Continued)

(58) Field of Classification Search
CPC .. C10G 1/083; C10G 1/08; B01J 4/002; B01J 19/00; B01J 19/26
See application file for complete search history.

(56) References Cited

U.S. PATENT DOCUMENTS 1,540,592 A    6/1925    Best
2,271,982 A    2/1942    Van Kreveld
(Continued)

FOREIGN PATENT DOCUMENTS

CN    1240815 A    1/2000
CN    103627458 A    3/2014
(Continued)

OTHER PUBLICATIONS

International Search Report and Written Opinion for PCT/EP2017/084093, dated Jan. 24, 2018.
(Continued)

*Primary Examiner* — Youngsul Jeong
(74) *Attorney, Agent, or Firm* — Boyle Fredrickson, S.C.

(57) ABSTRACT

A method for producing biomass derived liquid, comprises: feeding biomass, a solvent and a catalyst into a batch reactor, and heating and mixing in the batch reactor a compound comprising the biomass, solvent, and catalyst. The solvent is glycerol and wherein feeding the solvent into the batch reactor is performed through electrostatic atomization.

9 Claims, 2 Drawing Sheets

Figure 1:
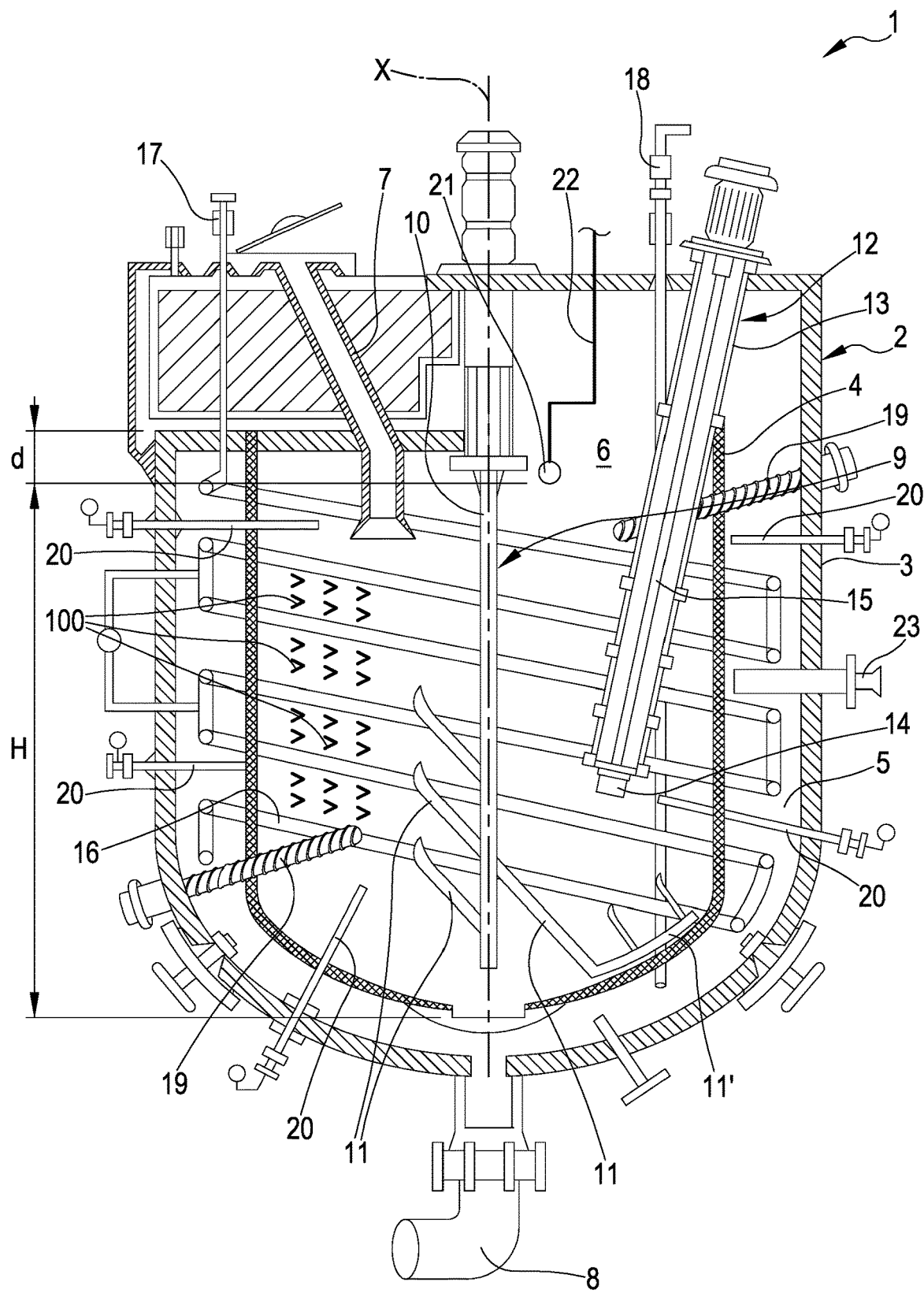
Figure 2:
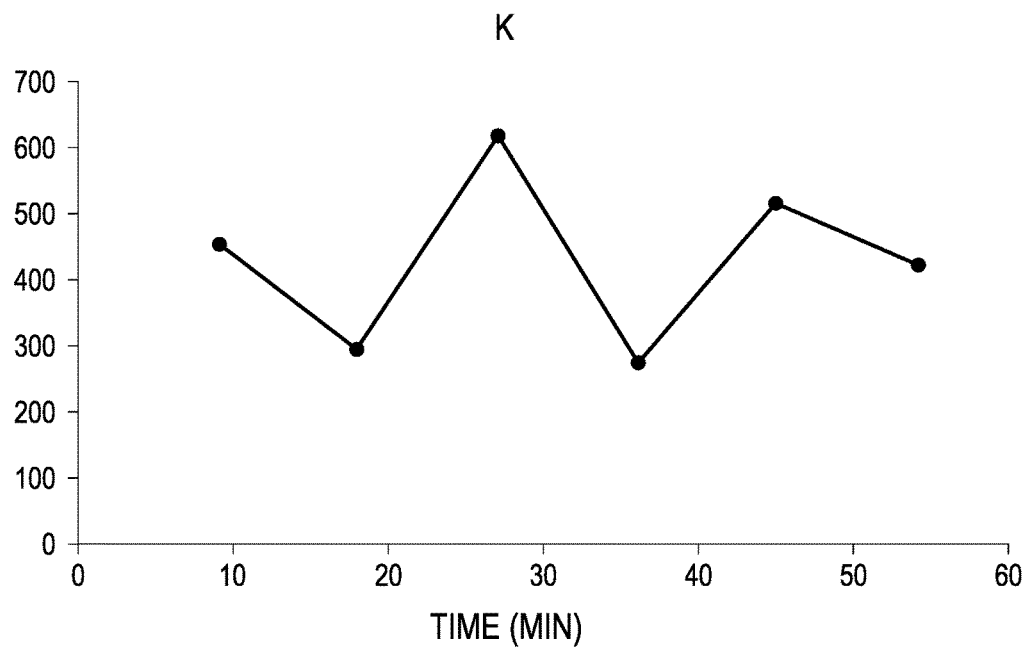
Figure 3:
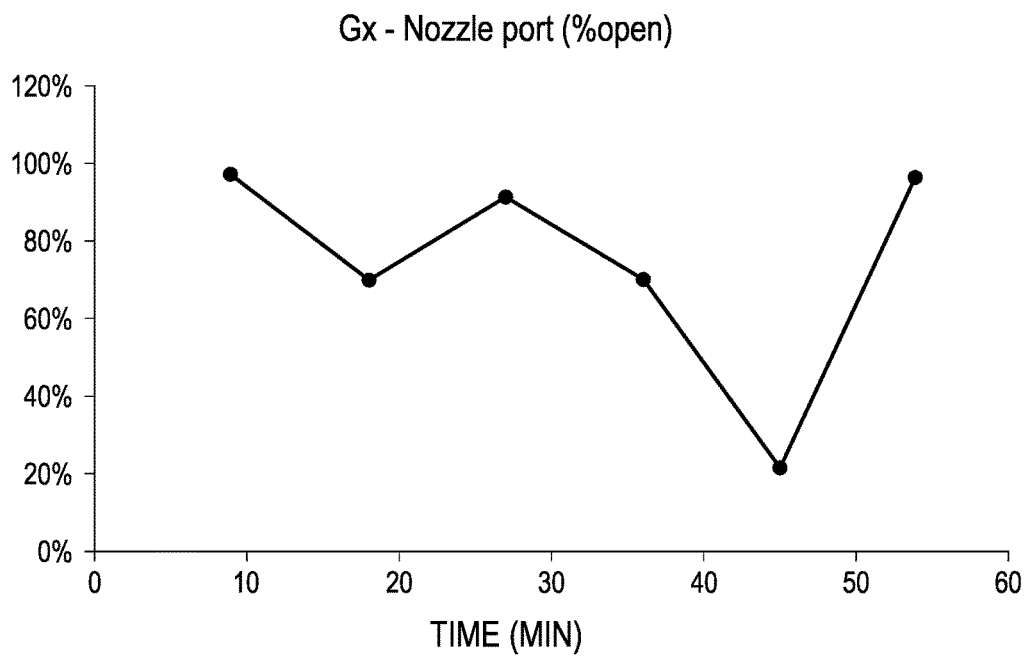

(51) Int. Cl.
- *B01J 19/00* (2006.01)
- *B01J 19/26* (2006.01)

(52) U.S. Cl.
CPC ...... *B01J 19/26* (2013.01); *B01J 2219/00029* (2013.01); *B01J 2219/00099* (2013.01); *B01J 2219/00164* (2013.01); *C10G 2300/1011* (2013.01); *C10G 2300/202* (2013.01); *C10G 2300/207* (2013.01); *C10G 2300/208* (2013.01); *C10G 2300/304* (2013.01); *C10G 2300/44* (2013.01)

(56) References Cited

U.S. PATENT DOCUMENTS

| | | | |
|---|---|---|---|
| 2,391,110 | A | 12/1945 | Walker |
| 3,759,450 | A | 9/1973 | Fram et al. |
| 4,135,829 | A | 1/1979 | Grillo et al. |
| 4,352,572 | A | 10/1982 | Chen et al. |
| 4,592,507 | A | 6/1986 | Benedict |
| 4,597,671 | A | 7/1986 | Marelli |
| 4,725,287 | A | 2/1988 | Gregoli et al. |
| 5,362,762 | A | 11/1994 | Beshouri |
| 5,851,245 | A | 12/1998 | Moriyama et al. |
| 6,068,670 | A | 5/2000 | Haupais et al. |
| 6,206,307 | B1 * | 3/2001 | Kelly .............. B05B 5/10 239/690 |
| 6,211,253 | B1 | 4/2001 | Marelli |
| 6,296,676 | B1 | 10/2001 | Nohara |
| 7,887,604 | B1 | 12/2011 | Hicks et al. |
| 8,425,766 | B2 * | 4/2013 | Bartek ............ C10B 49/16 208/400 |
| 10,316,264 | B2 | 6/2019 | Fumagalli |
| 10,751,675 | B2 | 8/2020 | Fumagalli |
| 2002/0088167 | A1 | 7/2002 | Filippini et al. |
| 2003/0008252 | A1 | 1/2003 | Watanabe |
| 2003/0024852 | A1 | 2/2003 | Huffer et al. |
| 2003/0079467 | A1 | 5/2003 | Liu et al. |
| 2003/0134755 | A1 | 7/2003 | Martin |
| 2004/0055210 | A1 | 3/2004 | Lif et al. |
| 2004/0191708 | A1 | 9/2004 | Matoba et al. |
| 2004/0229765 | A1 | 11/2004 | Gutierrez et al. |
| 2005/0090565 | A1 | 4/2005 | Sprague |
| 2005/0183324 | A1 | 8/2005 | Marelli |
| 2006/0048443 | A1 | 3/2006 | Filippini et al. |
| 2007/0028507 | A1 | 2/2007 | Strey et al. |
| 2007/0087104 | A1 | 4/2007 | Chanamai |
| 2007/0113938 | A1 | 5/2007 | Kim |
| 2007/0261293 | A1 | 11/2007 | Tajima et al. |
| 2008/0312346 | A1 * | 12/2008 | McCall ............ C10L 5/44 516/135 |
| 2009/0118380 | A1 | 5/2009 | Del Guadio et al. |
| 2009/0300969 | A1 | 12/2009 | Martin |
| 2010/0037513 | A1 | 2/2010 | Petrucci et al. |
| 2010/0270211 | A1 | 10/2010 | Wolny |
| 2010/0290307 | A1 | 11/2010 | Gordon et al. |
| 2011/0026358 | A1 | 2/2011 | Cheio De Oliveira et al. |
| 2011/0117019 | A1 | 5/2011 | Hawkins |
| 2012/0069698 | A1 | 3/2012 | Pack et al. |
| 2012/0079760 | A1 | 4/2012 | Savage et al. |
| 2012/0167451 | A1 | 7/2012 | Festuccia |
| 2012/0255886 | A1 | 10/2012 | Flores Oropeza et al. |
| 2012/0291339 | A1 | 11/2012 | Martin et al. |
| 2013/0118058 | A1 | 5/2013 | Nguyen et al. |
| 2013/0021871 | A1 | 6/2013 | Strahmann |
| 2013/0215706 | A1 | 8/2013 | Markert et al. |
| 2014/0121423 | A1 * | 5/2014 | Powell ............ C07C 29/132 568/905 |
| 2014/0202702 | A1 | 7/2014 | Cobb |
| 2014/0311020 | A1 | 10/2014 | Klausmeier et al. |
| 2015/0001135 | A1 | 1/2015 | Gattupalli et al. |
| 2020/0384428 | A1 | 12/2020 | Fumagalli |

FOREIGN PATENT DOCUMENTS

| | | |
|---|---|---|
| DE | 19932276 A1 | 1/2001 |
| DE | 19945508 A1 | 4/2001 |
| DE | 202004019745 U1 | 2/2005 |
| DE | 102007043302 A1 | 3/2009 |
| EP | 0595640 A1 | 10/1993 |
| EP | 0771629 A1 | 5/1997 |
| EP | 0958853 A1 | 11/1999 |
| EP | 1152049 A2 | 11/2001 |
| EP | 1489130 A1 | 12/2004 |
| EP | 1433748 A2 | 6/2006 |
| EP | 2532959 A2 | 12/2012 |
| EP | 2612898 A1 | 7/2013 |
| FR | 2461515 A1 | 2/1981 |
| FR | 2929133 A1 | 10/2009 |
| GB | 113032 | 2/1918 |
| GB | 974042 A | 11/1964 |
| GB | 2084038 A | 4/1982 |
| GB | 2348377 A | 3/1999 |
| IT | M120091797 A1 | 4/2011 |
| IT | UB20159709 A1 | 6/2017 |
| IT | 102016000028623 | 9/2017 |
| JP | s5380406 A | 7/1978 |
| JP | s56112993 A | 9/1981 |
| JP | s5780488 A | 5/1982 |
| JP | s58104415 A | 6/1983 |
| JP | s58140507 A | 8/1983 |
| JP | s60104190 A | 6/1985 |
| JP | s62138609 A | 6/1987 |
| JP | s6317960 A | 1/1988 |
| JP | 2001248501 A | 9/2001 |
| JP | 2006016495 A | 1/2006 |
| JP | 2007152214 A | 6/2007 |
| JP | 2007277503 A | 10/2007 |
| JP | 2009293819 A | 12/2009 |
| JP | 2011038000 A | 2/2011 |
| JP | 2011046701 A | 3/2011 |
| WO | 198102687 A1 | 10/1981 |
| WO | 199818884 A2 | 5/1998 |
| WO | 2003031540 A1 | 4/2003 |
| WO | 2003033097 A2 | 4/2003 |
| WO | 2004071670 A1 | 8/2004 |
| WO | 2005016499 | 2/2005 |
| WO | 2007083106 A2 | 7/2007 |
| WO | 2008084776 A1 | 7/2008 |
| WO | 2011015844 A1 | 2/2011 |
| WO | 2011021473 A1 | 2/2011 |
| WO | 2011115501 A1 | 9/2011 |
| WO | 2013098630 | 7/2013 |
| WO | 2013124726 A1 | 8/2013 |
| WO | 2014162280 | 10/2014 |
| WO | 2014162281 A2 | 10/2014 |
| WO | 2015150971 | 10/2015 |
| WO | 2015198231 | 12/2015 |
| WO | 2017013071 | 1/2017 |
| WO | 2017013074 | 1/2017 |
| WO | 2017060464 | 4/2017 |

OTHER PUBLICATIONS

Lif, Anna et al., Fischer-Tropsch Diesel Emulsions Stabilised by Microfibrillated Cellulose and Nonionic Surfactants, Journal of Colloid and Interface Science, vol. 352, Issue 2, Dec. 15, 2010, pp. 585-592.

* cited by examiner

APPARATUS AND METHOD FOR PRODUCING BIOMASS DERIVED LIQUID, BIO-FUEL AND BIO-MATERIAL

This application is a U.S. national stage application under 35 U.S.C. § 371(c) of International Application No. PCT/EP2017/084093, filed on Dec. 21, 2017, which claims priority to Italian Patent Application No. 102016000132801, filed on Dec. 30, 2016, the entire content each of which is incorporated by reference herein in its entirety.

FIELD OF THE INVENTION

The present invention relates to an apparatus and a method for producing biomass derived liquid. The present invention relates to biomass-to-liquid processes (BtL) and apparatuses which are focused to supply liquid energy from biomass. The present invention further relates to an apparatus and a method for producing bio-fuel and bio-material deriving from said biomass derived liquid.

BACKGROUND OF THE INVENTION

Nowaday, crude oil is still the principal energy resource for the World's transportation sector, which for centuries has revolutionized human mobility and living standards. The reason is the valuable products from crude oil refineries; energy carriers mainly in the form of liquid state hydrocarbons. Worldwide, some 90 millions barrels of crude oil are daily consumed, and in a future facing shortage on the principal energy source there is a need for new energy sources and carrier substitutes for the existing transportation.

In the long-term future energy system there is a necessity for energy- and resource-efficient Biomass-to-Liquids (BtL) processes, which is why research attention towards biomass as a supply for liquid energy carriers has been and still is rapidly growing.

Switching to biomass-derived fuels would not only slash current World carbon emissions, but potentially deflect the carbon emissions towards a descending trajectory. BtL is a major ongoing research focus worldwide due to the renewable aspects and abundance of biomass. Moreover, biomass is an energy carrier consisting of e.g. carbon and hydrogen; the backbone constituents of current hydrocarbon fuels.

Biomass in general is any organic matter derived from living and recently living organisms. This is in contrast to fossil organic matter, which is derived from dead organisms over millions of years.

Solvolytic Liquefaction of Biomass is known in the art. Liquefaction is a promising technology among the thermochemical routes to convert biomass to liquid valuable products via complex chemical and physical reactions. Bio oils, bio-crudes or polyols obtained via liquefaction of biomass can be upgraded to gasoline and diesel like fuels and various polymeric materials. Solvolysis liquefaction of biomass dissolves biomass in an organic solvent at moderate temperature (120 to 250° C.) and atmospheric pressure. Different organic solvents can be used in liquefaction, such as polyhydric alcohols such as ethylene glycol, polyethylene glycol (PEG) and glycerol, phenol, dioxane, ethanol, acetone and soon. Both strong acids, such as sulfuric acid and hydrochloric acid, and weak acid, such as oxalic acid, can be used as catalysts in biomass liquefaction.

High-Pressure Liquefaction of Biomass is known too in the art. Hydrothermal Liquefaction (HtL) is a thermo-chemical process utilizing an aqueous medium both as a biomass vehicle in continuous processing applications and as a reactant mainly for chemically disintegration of the biomass macrostructures. Chemical disintegration of the macrostructures demands the overcoming of the activation energies of the various biomass chemical bonds, which practically involves processing at elevated temperatures. In order to substantially liquefy biomass into a water-insoluble biocrude, processing conditions have to approach near-critical water conditions. At these conditions the water properties change significantly, which in turn may affect the pathways of chemical reactions. Above the critical point, water exists in a homogeneous phase where the density of water can vary from gas to liquid-like values and still remain in a homogeneous phase. In the transition from sub- to supercritical conditions water properties change drastically, which opens opportunities for tuning properties according to desirable reactions during biomass conversion.

In this field, the Applicant has observed that the known processes for producing biomass derived liquids, like known Solvolytic Liquefaction and Hydrothermal Liquefaction detailed above, have some drawbacks related, in particular, to high production costs and to the poor qualities of the obtained liquid.

As far as concern the production costs, the known processes imply very long reaction times which render said processes unsustainable.

As far as concern the properties of the biomass derived liquid, please note that biomass consists of hydrogen and carbon, like hydrocarbons, but also of heteroatoms like oxygen, nitrogen, and sulphur, which are inevitable traced in the BtL products. Consequently, in order to conform to a "drop-in" aspect a target in any advanced BtL process is to reduce the great amount of especially oxygen in the biomass to approach the composition of fossil products. The known processes do not exhibit the required drop-in propertied in the sense that the hydrocarbon infrastructure does not always remain unaltered.

It is therefore object of the present invention to provide an apparatus and a method for producing biomass derived liquid such that said biomass derived liquid and bio-fuel and bio-material deriving from said biomass derived liquid conform to the following:
- be sustainably produced;
- be based on an abundant non-food feedstock or feedstock mixture to have a high impact factor locally and globally;
- exhibit drop-in properties in the sense that the hydrocarbon infrastructure remains unaltered;
- obey all current regulations on fuel specifications and standards.

The Applicant has conceived a method for producing biomass derived liquid wherein the temperature of the compound (made of feedstock, solvent and preferably a catalyst) contained in a reactor is controlled in such a way to speed up the biomass liquefaction time and to improve the properties of the biomass derived liquid (and of and bio-fuel and bio-material deriving from said biomass derived liquid).

The Applicant has conceived a method for producing biomass derived liquid wherein a solvent, preferably glycerol, is fed through a temperature regulated nozzle flow rate which speed up the biomass liquefaction time such as to achieve the above mentioned objectives.

The Applicant has further conceived an apparatus for producing biomass derived liquid comprising a batch reactor, wherein the structure of the batch reactor allows to properly mix and heat the compound such as to achieve the above mentioned objectives.

The Applicant verified that the method and apparatus according to the invention allows to achieve the above mentioned objectives. In particular, the Applicant verified that the method and apparatus according to the invention provide a sustainable production of biomass derived liquid (short production time) of very high quality.

SUMMARY

In a first aspect, the invention relates to a method for producing biomass derived liquid, comprising:
feeding biomass, a solvent and a catalyst into a batch reactor;
heating and mixing in said batch reactor a compound mixture comprising said biomass, solvent and catalyst;
wherein feeding the solvent into the batch reactor is performed through electrostatic atomization.

In a second aspect, the invention relates to an apparatus for producing biomass derived liquid, comprising: a batch reactor comprising an internal reactor core configured to accommodate a compound mixture comprising biomass, a solvent and a catalyst; heating means to heat the internal reactor core; at least a mixing device operative inside the internal reactor core and configured to promote mixing; an electrostatic nozzle located in the internal reactor core; a control unit connected at least to the heating means and the electrostatic nozzle;
wherein the control unit is configured to perform the following procedure:
heating and mixing the compound in said internal reactor core;
feeding the solvent into the internal reactor core through the electrostatic nozzle by electrostatic atomization, preferably through jet mode electrostatic atomization.

The applicant verified that the electrostatic atomization of the solvent allows to greatly improve and maintain the efficiency reaction process and greatly reduce the process time.

In a preferred aspect, the solvent is glycerol.

In an aspect, the solvent may be chosen in the following group: polyhydric alcohols such as ethylene glycol, polyethylene glycol (PEG) and glycerol, phenol, dioxane, ethanol, acetone.

Electrostatic atomization is a process of reforming electrically atomized liquid phase glycerol. Reforming electrically atomized liquid phase glycerol nanodroplets on an oppositely conductive catalyst increases performance as opposed to a neutral catalyst-substrate system.

This nanophase reforming occurs when droplets sizes approach the 1-100 nm size in diameter. This results in a large increase in surface area and a more rapid and efficient lignocellulosic to fuel conversion cycle.

Electrostatic atomization has proven to be a viable solution to this limiting factor in mass transfer and chemical reformulation. In addition to increasing the surface area and speed of molecular reformulation during solvolysis, there is an added benefit to electric charging. Glycerol droplets are forced towards catalytic surfaces as opposed to experiencing a "random walk" in a uniform field.

The applicant verified that, within the reactor process (solvolysis process), the addition of glycerol upgrades the biomass, in particular the lignocellulosic feedstock, to biomass derived liquid, in particular biofuel.

The applicant also verified that the addition of glycerol during the batch process through electrostatic atomization provides for a number of benefits, namely more efficient usage of glycerol feedstock, better uptake of hydrogen fuel formation.

In an aspect according to the preceding aspects, a nozzle flow rate of the solvent is controlled as a function of a reactor temperature.

The applicant verified that the temperature regulated nozzle flow rate allows to greatly improve and maintain the efficiency reaction process and greatly reduce the process time.

In one aspect, the nozzle flow rate is a function of the multiplication of the reactor temperature K and a reactor pressure Kpa.

In one aspect, the reactor pressure is autogenic. The pressure is an outcome of the temperature variance, biomass density, biomass composition, reactor volume and reactor thermal exchange state. The pressure derives from the closed nature of the reactor core and the equation of state of the compound.

In one aspect, a reactor temperature is controlled to vary over time during mixing.

In one aspect, a reactor temperature is controlled to raise and fall over time over time during mixing.

In one aspect, a profile of the reactor temperature follows a sine wave function, preferably a marginally distorted damped sine wave function.

In one aspect, the reactor temperature varies between about 290 K and 630 K over time during mixing.

In one aspect, the nozzle flow rate is given by the following algorithm:

$$Gx=(\phi*InRx)+A$$

wherein $\phi$ is a dimensionless glycerol atomization constant;

wherein A is another constant;

wherein Rx is the square root of (K*Kpa).

In one aspect, the nozzle flow rate expressed as a percentage of the maximum nozzle flow rate is comprised between about 10% and 100%.

In one aspect, said nozzle flow rate is comprised between about 20% and 98%.

In one aspect, the catalyst is an acid, such as sulfuric acid, hydrochloric acid, oxalic acid.

In one aspect, the biomass feedstock is comprised between about 48% and about 69% of the overall compound.

In one aspect, the solvent is comprised between about 30% and about 50% of the overall compound.

In one aspect, the catalyst is comprised between about 1% and about 2% of the overall compound.

In one aspect, the process time of the batch is less than 2 hours, preferably less than about 1 hour.

In one aspect, the electrostatic nozzle is placed close to a top of the internal reactor core.

In one aspect, the biomass derived liquid obtained from the process is further processed to obtain biofuel.

In one aspect, the biomass derived liquid obtained from the process is gasified to obtain biogas.

In one aspect, the biomass derived liquid obtained from the process is refined to obtain synthetic oil.

In one aspect, the biomass derived liquid obtained from the process is further processed to obtain biomass (biopolymers).

In one aspect, the electrostatic nozzle is placed no more than 15% of a height of the internal reactor core from said top.

In one aspect, the electrostatic nozzle is placed close to a top dead center (TDC) of the internal core reactor.

In one aspect, the electrostatic nozzle contains a two electrode charge injection atomizer, preferably a high voltage terminal (preferably up to 30.0000 volts) and a ground electrode together in said nozzle. Dielectric glycerol flows between both electrodes before exiting through an orifice into the reactor core/chamber. As the glycerol exits, electrons move to the surface and overcome surface tension forces.

In one aspect, the apparatus comprises an outer shell and an inner shell delimiting a hollow space therebetween.

In one aspect, at least some of the heating means are placed inside said hollow space.

In one aspect, the heating means comprises a tubing placed inside said hollow space and preferably wound around the inner shell, wherein a temperature controlled fluid, preferably water, flows inside said tubing.

In one aspect, the heating means comprises heaters, preferably electric heaters, at least in part placed inside the inner shell.

In one aspect, said at least a mixing device comprises a first mixer configured to promote a turbulent mixing of the compound revolving about a main vertical axis of the internal reactor core.

In one aspect, the first mixer comprises a vertical shaft provided with radial protrusions.

In one aspect, the vertical shaft is coaxial to a main vertical axis of the internal reactor core.

In one aspect, at least one of said protrusions graze an inner bottom wall of the inner shell.

In one aspect, said at least a mixing device comprises a second mixer configured to promote a turbulent mixing of the compound between an upper and a lower portion of the internal reactor core.

In one aspect, the second mixer is a high-shear batch mixer, preferably a Siverson® batch mixer. Silverston® mixer, know per se, is configured to mix, emulsify, homogenize, solubilize, suspend, disperse and disintegrate solids.

In one aspect, an inner surface of the inner shell is provided with a plurality of reliefs, like tips or spikes, which promote mixing.

Further characteristics and advantages will be clear from the detailed description of a preferred but not exclusive embodiment of an apparatus and a process for producing biomass derived liquid.

DESCRIPTION OF DRAWINGS

Such description will be set forth hereinbelow with reference to the set of drawings, provided merely as a non-limiting example, in which:

FIG. 1 is a schematic view of the apparatus for producing biomass derived liquid according to the invention;

FIG. 2 is a chart of an example of temperature profile over time of a process for producing biomass derived liquid according to the invention; and FIG. 3 is a chart of an example of nozzle flow rate profile over time of the process of FIG. 2.

DETAILED DESCRIPTION

Referring to the attached schematic FIG. 1, the apparatus for producing biomass derived liquid is identified by reference numeral 1. The apparatus 1 comprises a batch reactor 2 provided with an outer shell 3 and an inner shell 4 placed inside the outer shell 3.

The outer shell 3 and the inner shell 4 are shaped like cups and are spaced one from the other to delimit a hollow space 5 therebetween.

The inner shell 4 delimits an internal reactor core 6 which is configured to accommodate a compound comprising a biomass to be transformed into biomass derived liquid, a solvent and a catalyst.

An inlet conduit 7 passes through a top wall of the outer shell 3 and through a top wall of the inner shell 4 to define an inlet port of the batch reactor 2. An outlet conduit 8 opens at the bottom of the batch reactor 2 to allow extraction of the biomass derived liquid following the solvolysis reactor batch process.

A first mixer 9 is mounted on the top wall of the outer shell 3 and comprises a vertical shaft 10 protruding inside the internal reactor core 6 along a main vertical axis "X" of said internal reactor core 6. The vertical shaft 10 extends down to the bottom wall of the inner shell 4 and comprises a plurality of radial protrusions 11. As shown in FIG. 1, one 11' of this protrusions 11 is placed close to the bottom wall of the inner shell 4 and grazes a surface of said bottom wall. A first motor, not shown, is placed outside the batch reactor 2 and it is connected to the vertical shaft 10. The first mixer 9 is configured to promote a turbulent mixing of the compound revolving about the main vertical axis "X" of the internal reactor core 6. A second mixer 12 is mounted on the top wall of the outer shell 3 and protrudes overhang inside the internal reactor core 6 along a direction which is skew with respect to the main vertical axis "X" of the internal reactor core 6. The second mixer 12 is a high-shear batch mixer, preferably a Silverson® batch mixer. The second mixer 12 comprises an elongated frame 13 formed by a plurality of rods. A work head 14 provided with high speed rotation blades is placed at a terminal end of the elongated frame 13. The work head 14 comprises a perforated casing housing a rotor with the high speed rotation blades. A transmission shaft 15 connects the rotor to a second motor, not shown, which is placed outside the batch reactor 2 and it is connected to the transmission shaft 15. The second mixer 12 is configured to promote a turbulent mixing of the compound between an upper and a lower portion of the internal reactor core 6.

An inner surface of the inner shell 4 is provided with a plurality of reliefs 100, like tips or spikes, which promote mixing.

The apparatus further comprises heating means configured to heat the internal reactor core 6.

The heating means comprises a tubing 16 wound around the inner shell 4. Such tubing 16 is placed inside the hollow space 5 between the outer shell 3 and the inner shell 4. Such tubing 16 is provided with an inlet 17 and an outlet 18 passing through a top wall of the outer shell 3 and a top wall of the inner shell 4. The tubing 16 is part of a heating/cooling circuit. A heated or cooled fluid, preferably water, flows through said tubing 16 to change the inner temperature of the internal reactor core 6. An external device (like a heat exchanger or a boiler), not shown, is connected to the tubing 16 to heat or cool the fluid in controlled manner.

The heating means further comprises electric heaters 19 protruding inside the internal reactor core 6 and connected to an electric source, not shown.

Temperature sensors 20, such as thermocouples, are placed inside the internal reactor core 6 to detect the temperature of the biomass during the process.

Apparatus 1 further comprises an electrostatic nozzle 21 connected, through a conduit 22, to a reservoir, not shown, for a solvent. The electrostatic nozzle 21 contains a high voltage terminal (up to 30.0000 volts) and a ground electrode.

As shown in FIG. 1, the electrostatic nozzle 21 is placed close to a top dead center (TDC) of the internal reactor core 6. The electrostatic nozzle 21 is placed no more than 15% of a height "H" of the internal reactor core 6 from said top. In the illustrated embodiment, the electrostatic nozzle 21 is spaced from the top of a distance "d" which is about 10% of "H".

An outlet opening 23 for vacuum is also present on the batch reactor 2 in order to extract possible air from the internal reactor core 6.

A control unit, not shown, is operatively connected to the first and second motor of the mixers 9, 12, to the heating means 16, 19, to the temperature sensors 20 and to the electrostatic nozzle 21, in order to check and control the process of the invention.

In use and according to the process of the invention, a batch of biomass feedstock (60%) together with sulfuric acid (catalyst, 1%) is fed into the internal reactor core 6 through the inlet conduit 7.

The biomass feedstock may be woody or lignocellulosic biomass, herbaceous plants, starch and triglyceride producing plants, etc. The biomass feedstock may be agricultural waste, energy crops, forestry waste, aquatic biomass, etc.

Once the internal reactor core 6 is filled, the mixers 9, 12 are started to mix up the compound and the heaters 16, 19 start heating and/or cooling the compound while glycerol (solvent, 39%) is fed by jet electrostatic atomization into the internal reactor core 6 through the electrostatic nozzle 21.

The control unit checks the compound temperature/s by means of the temperature sensors 20 and controls the heating means 16, 19. The temperature of the compound is regulated automatically or by an operator to follow a predetermined profile which may be also stored in the control unit. The resulting pressure "Kpa" is autogenic.

The following table (Table 1) shows an example of temperature and pressure profiles for a process of 55 minutes.

T=time of reaction in minutes, beginning at minute 1, ending at minute 55
P=pressure expressed in bars
C=temperature expressed in Celsius
K=temperature expressed in Kelvin
Kpa=pressure expressed in kilopascals

TABLE 1

| T | P | Kpa | C | K |
|---|---|---|---|---|
| 9 | 80 | 8000 | 185 | 458 |
| 18 | 160 | 16000 | 25 | 298 |
| 27 | 30 | 3000 | 350 | 623 |
| 36 | 80 | 8000 | 1 | 274 |
| 45 | 120 | 12000 | 246 | 519 |
| 54 | 2 | 200 | 150 | 423 |

The profile of the reactor temperature "K" follows a marginally distorted damped sine wave function.

The flow rate "Gx" of glycerol through the electrostatic nozzle 21 (nozzle flow rate) is controlled as a function of a reactor temperature "K".

Said nozzle flow rate "Gx" is expressed as a percent of a maximum nozzle flow rate and it is given by the following algorithm:

$$Gx=(\phi*lnRx)+A$$

wherein
$\phi$ is a dimensionless glycerol atomization constant;
A is another constant;
Rx is the square root of (K*Kpa).

This algorithm describes the usage of electrically atomized glycerol and the relationship between nozzle flow rate "Gx" and temperature regulation during the solvolysis process.

The following table (Table 2) shows the nozzle flow rate "Gx".

TABLE 2

| T | Kpa | K | Rx | Gx - Nozzle port (% open) |
|---|---|---|---|---|
| 9 | 8000 | 458 | 1914 | 98% |
| 18 | 16000 | 298 | 2184 | 70% |
| 27 | 3000 | 623 | 1367 | 92% |
| 36 | 8000 | 274 | 1478 | 70% |
| 45 | 12000 | 519 | 2496 | 21% |
| 54 | 200 | 423 | 650 | 97% |

The control unit controls the electrostatic nozzle to follow the profile of "Gx" shown in Table 2.

Temperature regulated nozzle flow rate has proven to be the most effective in maintaining an efficiency reaction process.

The biomass derived liquid obtained from this process has excellent properties, as shown in the following tables (Tables 3 and 4).

TABLE 3

| Test | Unit | Result |
|---|---|---|
| Total Solid TS | kg/tTQ | 771 |
| Total volatile solid TVS | kg/tTQ | 719 |
| TVS/TS | % | 93 |
| Chemical Oxigen Demand COD | kg/tTQ | 766 |

TABLE 4

| Test | Unit | Method | Result |
|---|---|---|---|
| Total Acid Number | mg KOH/g | ASTM D 664 | 31.96 |
| H2S | mg/Kg | IP 570 | <0.10 |
| Pourpoint | ° C. | ISO 3016 | −21 |
| Ash | % (m/m) | ISO 6245 | 0.499 |
| Sulphur | % (m/m) | ISO 8754 | 0.16 |
| Element analysis | | ASTM D 5291 | |
| Carbon | % (m/m) | | 48.45 |
| Hydrogen | % (m/m) | | 8.29 |
| Oxygen | % (m/m) | | 41.93 |
| Nitrogen | % (m/m) | | 0.2 |

The biomass derived liquid obtained from this process may be further processed to obtain biofuel, like liquid biofuel (synthetic oil) and/or biogas, and biopolymers.

The invention claimed is:

1. A method for producing biomass derived liquid, comprising:
feeding biomass, a solvent and a catalyst into a batch reactor; and
heating and mixing in said batch reactor a compound mixture comprising said biomass, said solvent and said catalyst, thereby producing the biomass derived liquid in the batch reactor,
wherein the solvent is glycerol and wherein feeding the solvent into the batch reactor is performed through electrostatic atomization, and wherein the solvent is fed into an internal reactor core of the batch reactor through an electrostatic nozzle located in the internal reactor core.

2. The method of claim 1, wherein a nozzle flow rate of the solvent in the electrostatic nozzle is controlled as a function of a reactor temperature.

3. The method of claim 2, wherein the nozzle flow rate is a function of a multiplication of the reactor temperature and a reactor pressure.

4. The method of claim 3, wherein the reactor pressure is autogenic pressure.

5. The method of claim 1, wherein a reactor temperature is controlled to vary over time during the mixing.

6. The method of claim 5, wherein a profile of the reactor temperature follows a damped sine wave function.

7. The method of claim 2, wherein the nozzle flow rate is between about 10% and about 100% of a maximum nozzle flow rate.

8. The method of claim 7, wherein the nozzle flow rate is between about 20% and about 98% of the maximum nozzle flow rate.

9. A method for producing a biomass derived liquid comprising:

configuring a batch reactor comprising an internal reactor core to accommodate a compound mixture comprising biomass, a solvent, and a catalyst;

placing an electrostatic nozzle into the internal reactor core;

providing an outer shell and an inner shell which define a hollow space therebetween;

placing heating means comprising heaters at least partially placed inside the hollow space;

heating the internal reactor core with the heating means comprising heaters;

feeding the solvent into the internal reactor core through an electrostatic nozzle by electrostatic atomization;

controlling a control unit connected at least to the heating means comprising heaters and the electrostatic nozzle;

mixing the compound mixture inside the internal reactor core;

controlling a nozzle flow rate in the electrostatic nozzle between about 20% and about 98% of the maximum nozzle flow rate; and producing the biomass derived liquid in the batch reactor.